March 4, 1958 J. P. HEISS 2,825,579
SELF-CONTAINED AUTOMATIC LEVELING VEHICLE SUSPENSION
Filed Sept. 13, 1955 4 Sheets-Sheet 1

Inventor
JOHN P. HEISS

Inventor
JOHN P. HEISS

March 4, 1958      J. P. HEISS      2,825,579
SELF-CONTAINED AUTOMATIC LEVELING VEHICLE SUSPENSION
Filed Sept. 13, 1955      4 Sheets-Sheet 3

Inventor
JOHN P HEISS

March 4, 1958 J. P. HEISS 2,825,579
SELF-CONTAINED AUTOMATIC LEVELING VEHICLE SUSPENSION
Filed Sept. 13, 1955 4 Sheets-Sheet 4
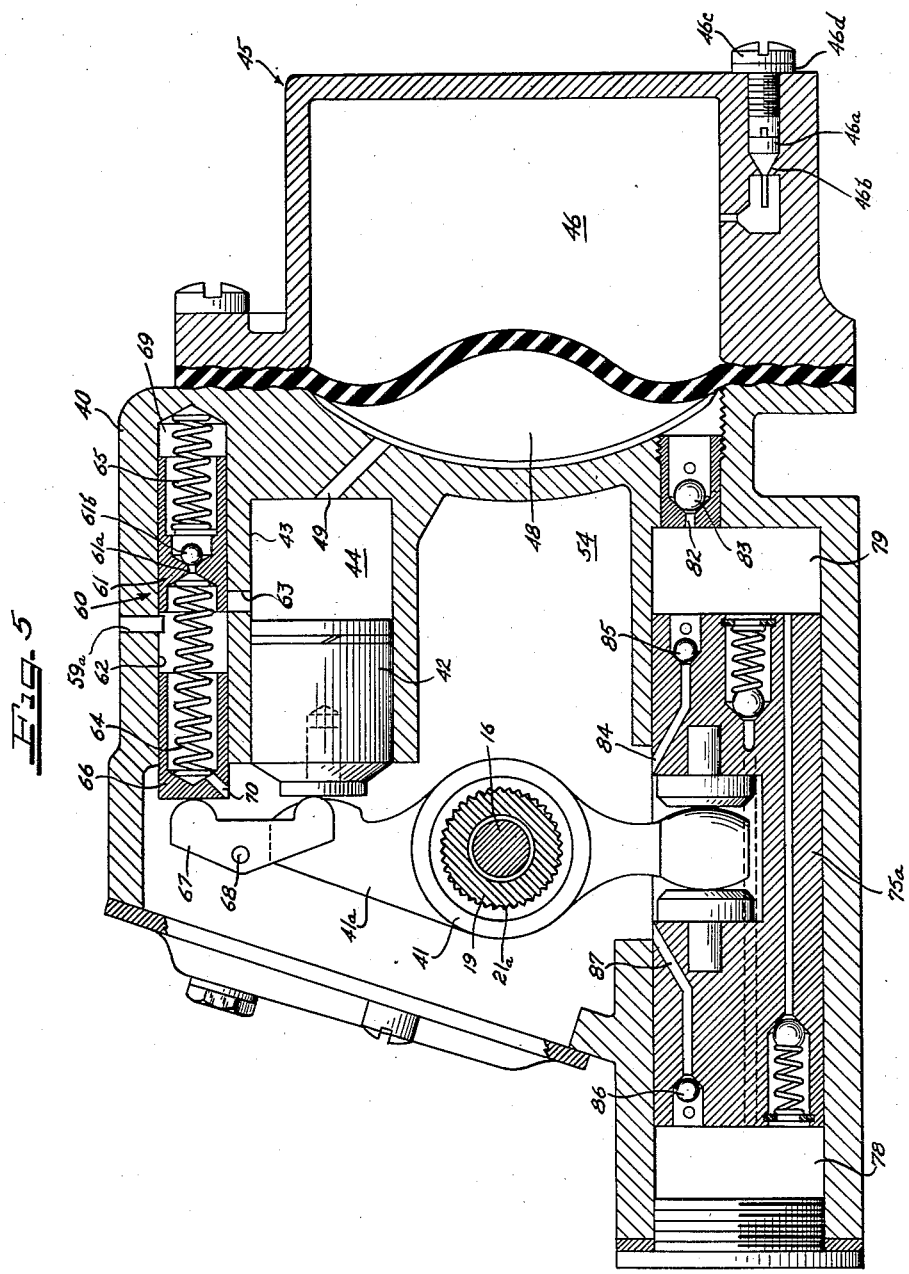
Inventor
JOHN P. HEISS
by Hill, Sherman, Meroni, Gross & Simpson
Attys.

United States Patent Office 2,825,579
Patented Mar. 4, 1958

2,825,579

SELF-CONTAINED AUTOMATIC LEVELING VEHICLE SUSPENSION

John P. Heiss, Flint, Mich., assignor to Thompson Products, Inc., Cleveland, Ohio, a corporation of Ohio Application September 13, 1955, Serial No. 534,122

16 Claims. (Cl. 280—124)

The present invention relates to suspension systems for vehicles and is, more particularly, concerned with the provision of a self-contained automatic leveling unit for maintaining an individual vehicle road wheel in a predetermined position relative to the vehicle frame. Additionally, the present invention is concerned with the provision of an improved suspension system, in general, for land vehicles.

As those skilled in the art of vehicle suspension are aware, there have been numerous systems devised for resiliently suspending the body and frame of a land vehicle above the road wheels and the parts associated therewith. Although the advantages of independently sprung or suspended wheels have long been known in the field, the expense ordinarily involved in independently suspending each individual wheel of a vehicle has generally precluded the use of such systems except at the front wheels of the vehicle. At the present date, all commercially sold passenger vehicles in the United States utilize a one-piece rear axle housing unit in which the rear axles are coaxially aligned at all times. In such systems, the differential housing, in which the reduction gearing associated with the drive shaft and rear axle is located, is fixedly secured to the axle housing and is, accordingly, "unsprung." Since the differential gearing and the rear axle housing are both of considerable weight, the unsprung weight of the vehicle is necessarily relatively large when such constructions are utilized. Since extensive testing has shown that one of the important factors in a comfortable vehicle ride is the unsprung weight of the vehicle relative to the sprung weight, and that the ride is improved with a reduction in the unsprung weight, it is desired that a vehicle system be provided with a minimum unsprung weight if possible.

Another important factor in providing satisfactory vehicle ride characteristics has been found to be the spring rate of the vehicle springs between the wheels and the frame. In modern passenger vehicles, a spring rate of approximately 170 pounds per inch deflection has been found a relatively satisfactory compromise. It is, however, recognized by those skilled in the art that such a spring rate is, in fact, a compromise and that it would be desirable, if possible, to attain a spring rate substantially lower, and in fact less than 100 pounds per inch. The reason that the high spring rate has been found necessary is that vehicles must be designed to carry loads substantially in excess of the load ordinarily contemplated, in order to provide for a proper margin of safety. Such rigid springing, however, provides relatively poor riding characteristics when the vehicle is operating at its normal, partial load and in order to provide optimum ride characteristics it would be desirable to have a very low spring rate at times when the vehicle is relatively unloaded and a progressively higher spring rate as the vehicle assumes greater loads.

In accordance with the principles of the present invention, an independently sprung rear wheel system is provided for passenger vehicles and, additionally, a variable spring rate is provided in accordance with the needs above outlined. At the same time, expense has been maintained at an absolute minimum and, in fact, the total cost of the system hereinafter set forth is no greater than the conventional much less satisfactory mechanical spring system of the type presently manufactured. In accordance with the present invention a hydraulic-pneumatic spring system is provided for suspending the individual vehicle wheel. The system is provided with means for automatically maintaining the vehicle body level or "attitude" at a predetermined optimum position. Integral pump means are provided in each of the wheel suspension units to provide hydraulic pressure sufficient to operate the leveling mechanism. By providing a compact, unitary, suspension unit at each vehicle wheel, in which a pneumatic spring is provided and wherein hydraulic fluid pressure means are adapted to automatically maintain a predetermined suspension level, which operation inherently provides an increasing spring rate with increased load, all mechanical springs are eliminated from the system and positioning the rear axle differential on the vehicle frame, in a "sprung" condition becomes not only practicable but relatively inexpensive.

In providing the improved system above discussed, an air spring unit is rigidly secured to the vehicle frame adjacent each rear wheel. This unit comprises a pneumatic chamber in which air or other gas is compressed to a predetermined no load spring condition by hydraulic fluid acting against a piston or diaphragm forming one wall of the pneumatic spring air chamber. The hydraulic fluid in turn acts against a system mechanically linked to the vehicle wheel adjacent the respective suspension unit and operates, as the hydraulic fluid pressure increases, to lift the vehicle body, with the attached suspension unit, upwardly relative to the wheel itself. With a decrease in hydraulic pressure, the vehicle body lowers relative to the vehicle wheel. Hydraulic pressure is maintained against the wheel position controlling piston by means of a leveling valve which is sensitive to vehicle position and which opens to reduce the hydraulic pressure when the vehicle body assumes a position higher than the predetermined optimum position or "attitude" and closes to permit an additional buildup of pressure when the vehicle body assumes a lower position than a predetermined optimum. The hydraulic fluid pressure is built up by means of a novel, integral, fluid pump directly associated with the level controlling valve actuator or sensing device such that continued oscillations thereof, which results from the ordinary movement of the vehicle over uneven roads serve to actuate a pump plunger. Thus, as the vehicle is operated, the hydraulic pump continuously operates to produce a high pressure source of hydraulic fluid for maintaining the vehicle in its designed position.

As will be more specifically illustrated below, the suspension unit as thus described permits the mounting of the individual vehicle rear wheels by means of an efficient trailing link suspension substantially independently of each other. Further, the arrangement permits the simple utilization of a "sprung" differential connected to the respective rear wheels by means of a universal joint, thereby substantially reducing the unsprung weight heretofore considered necessary, mainly for economic reasons, in commercially sold passenger vehicles.

It is, accordingly, an object of the present invention to provide an improved vehicle rear wheel suspension embodying independently suspended rear wheels and a sprung differential.

Another object of the present invention is to provide an improved and relatively inexpensive suspension for vehicle wheels wherein the effective spring rate increases as the vehicle loading increases and wherein the relative position of the vehicle wheel and the vehicle frame are maintained at a predetermined optimum position.

Still another object of the present invention is to provide an improved automatically leveling hydraulic-pneumatic vehicle suspension utilizing no external hydraulic fluid pump, pressurized air sources or the like.

Yet a further object of the present invention is to provide an improved vehicle rear wheel suspension utilizing a trailing link geometry and an automatically leveling hydraulic-pneumatic individual suspension unit at each rear wheel for maintaining each rear wheel in an independently sprung optimum running condition.

Still a further object of the present invention is to provide an independently sprung rear wheel suspension for vehicles wherein a single compact unit automatically provides for vehicle leveling, vehicle wheel spring suspension action, vehicle wheel shock absorption, and a source of pressurized hydraulic fluid for suspension operation.

A feature of the invention is a novel leveling valve unit capable of constantly sensing the relative position of the vehicle rear wheels and the vehicle frame and operating to change such relative position only during relatively long term changes in loading.

Another feature of the invention is the provision of a simple, yet efficient, "brain" for automatic leveling devices whereby instantaneous fluctuations in the vehicle suspension system resulting from uneven road conditions or the like are prevented from influencing the level of the vehicle.

Still a further feature of the invention is the provision of novel means for preventing collapse of the automatic leveling vehicle suspension unit when the vehicle is not in operation.

Another feature of the invention is the provision of a parallelogram trailing link rear wheel suspension linkage.

Yet a further feature of the present invention is the provision of a reciprocal plunger hydraulic pump constructed for direct actuation by and in association with the vehicle suspension shock absorption structure and operable to provide pressure for maintaining the vehicle in a predetermined optimum attitude.

Yet another object of the present invention is to provide a vehicle rear wheel suspension system wherein the individual rear wheels are independently sprung but are resiliently tied together through a torsion bar pivot member to provide vehicle stability during turn.

Still other and further objects and features of the present invention will at once become apparent to those skilled in the art from a consideration of the attached drawings wherein two preferred forms of the present invention are shown by way of illustration only, and wherein:

Figure 5 is a modified form of the leveling apparatus shown in Figure 4.

As shown on the drawings:

Figure 1:
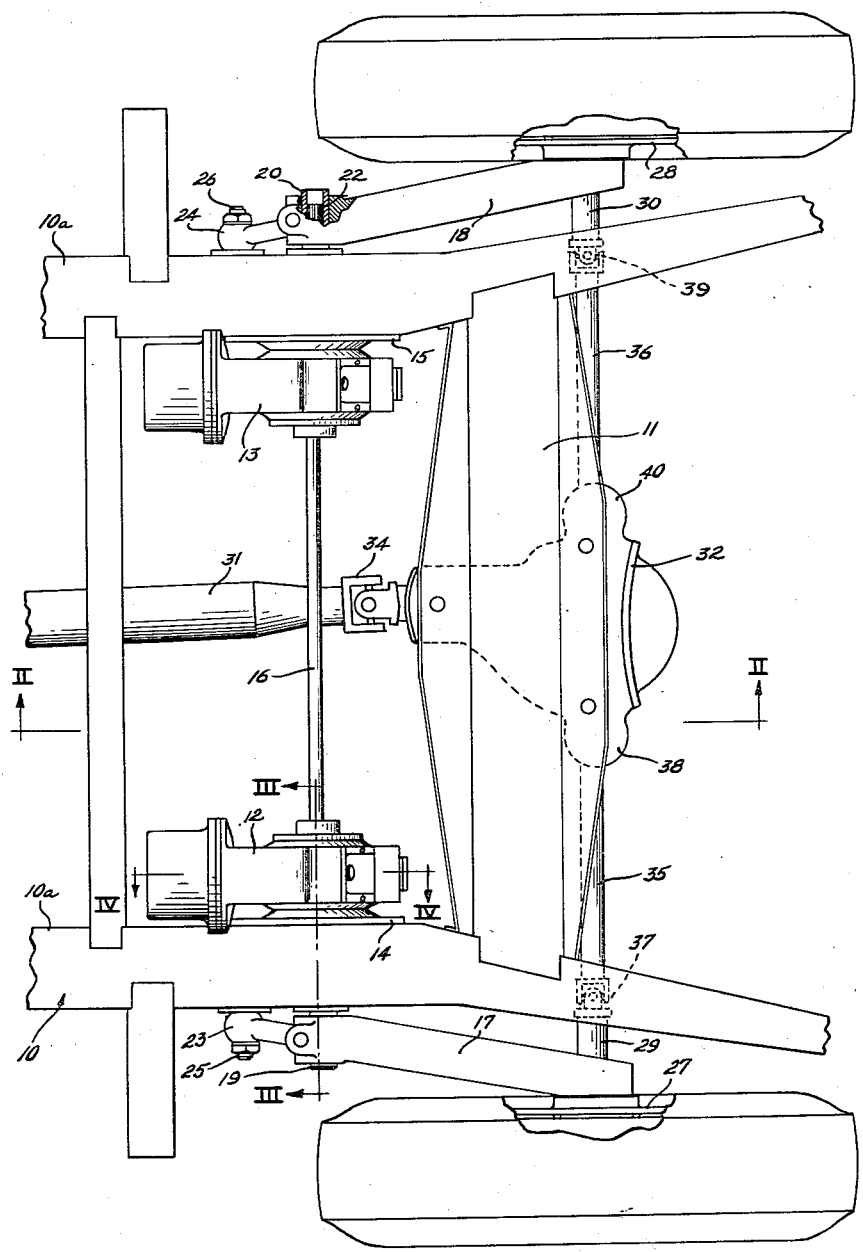
Figure 1 is a plan view of a vehicle rear wheel suspension constructed in accordance with the principles of the present invention.
Figure 2:
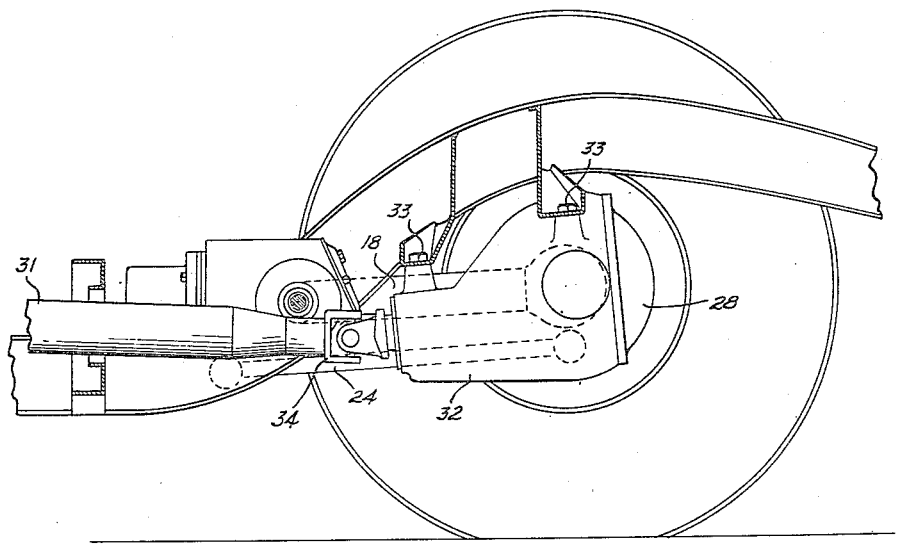
Figure 2 is a side elevational view of the suspension system shown in Figure 1 and taken along the line II—II thereof.
Figure 3:
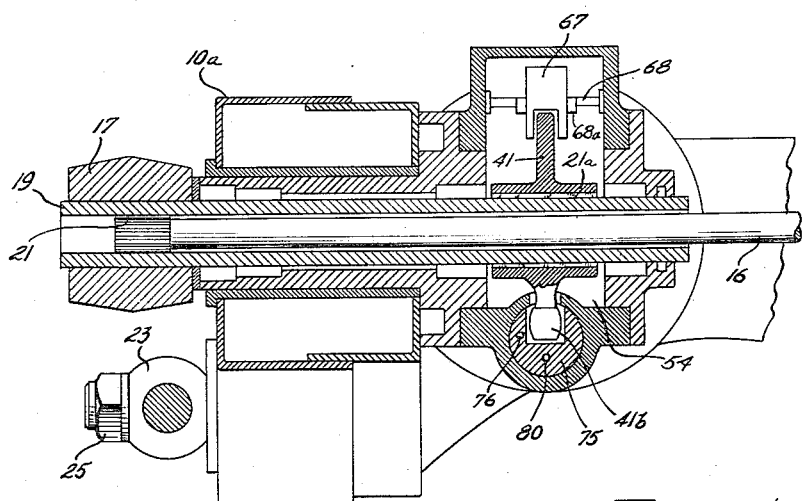
Figure 3 is an end elevational view, in cross-section, illustrating the suspension shown in Figure 1 and taken along the line III—III of that Figure.

The overall suspension system constructed in accordance with the present invention may be seen from a consideration of Figures 1 through 3. As there illustrated, a vehicle frame 10 having a rigid transverse cross-bracing member 11 carries a pair of leveling units 12 and 13. The units 12 and 13 are rigidly secured to the longitudinal rail 10a of the frame 10 by means of bolting flanges 14 and 15 respectively. The suspension units 12 and 13 provide a pivot for a transverse torsion bar stabilizing rod 16 which is angularly secured to an upper wheel suspension trailing link 17 at one end and a symmetrical link 18 at the other end through link supporting tubes 19 and 20 respectively. As may be seen from Figure 3, the stabilizing bar 16 is secured to the respective links 17 and 18 through the tubes 19 and 20 by means of a splined connection with the latter, as indicated at 21 and 22.

Lower trailing links 23 and 24 are pivotally secured to the longitudinal frame rail 10a by meanas of respective pivot bolts 25 and 26 and extend generally parallel to the respective upper trailing links 17 and 18 to a point of connection with the wheel brake backing plates 27 and 28. Since the backing plates 27 and 28 are constructed of one-piece rigid material, a parallelogram type linkage is provided in which the vehicle wheels are permitted to move in a substantially straight vertical direction but wherein the backing plates are prevented from rotation. As will be apparent, the trailing link construction above described operates to maintain a predetermined radius of movement for the individual rear wheel axles 29 and 30 and transfers the torque from the axle to the vehicle frame during forward or rearward movement of the vehicle.

The stabilizer bar 16 provides no spring function for maintaining the vehicle axles in a predetermined position relative to the frame. However, the bar does resiliently tend to maintain the upper links 17 and 18 in parallelism with each other. Thus, the links 17 and 18, and hence the axles 29 and 30 will tend to move in synchronism, thereby maintaining the vehicle frame 10 approximately level during turn conditions in which the tendency is for one side only of the frame to dip while the other side lifts upwardly away from the supporting surface.

Power is applied to the axles 29 and 30, via a conventional propeller shaft 31 through a differential reduction gear 32, the housing of which is fixedly secured to the transverse cross brace 11 by means of bolts 33. Since the differential gearing 32 is fixedly secured to the frame 11, limited angle universal joints, such as illustrated at 34, may be used between the propeller shaft and the differential, as well as between the propeller shaft and the vehicle engine, thereby substantially reducing the cost of the propeller shaft. Stub shafts 35 and 36 connect the differential to the respective axles 29 and 30 and are provided with universal joints at both their ends, as indicated at 37, 38, 39 and 40, thereby permitting vertical movement of the axles 29 and 30 under control of the trailing links 17, 18, 23 and 24 without interference with the transmission of power.

The position of the axles 29 and 30 relative to the frame 10 is controlled through the upper trailing link arms 17 and 18, respectively. These arms are pivoted by the respective sleeves 19 and 20 which are in turn angularly controlled by the respective leveling units 12 and 13. The units 12 and 13 are identical except for the obvious changes necessary to permit their assembly on opposite sides of the vehicle frame, and, accordingly, one of the units will be described in detail.

Figure 4:
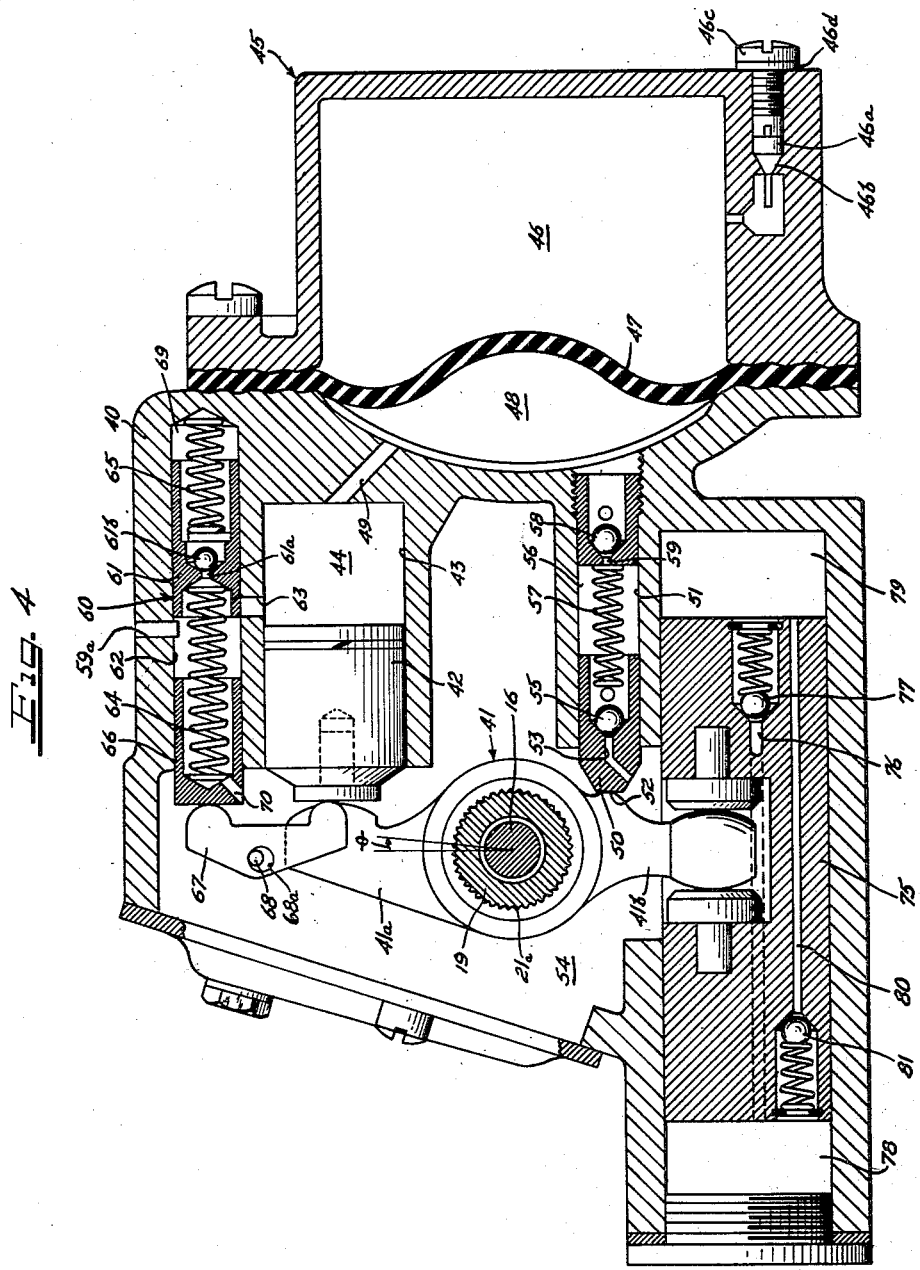
Figure 4 is an enlarged view of the automatic leveling unit illustrated in Figure 1, in cross-section, and taken along the line IV—IV of that Figure.

As shown in Figure 4, the leveling unit 12 comprises a housing 40 rigidly secured to the frame 10. A rocker arm 41 is pivotally mounted in the housing 40 and is secured to sleeve 19 for rotation therewith by means of spline 21. Rotation of the rocker arm 41 in the clockwise direction occurs when the vehicle frame moves downwardly relative to its supporting surface and the trailing link arm 17 tends to pivot upwardly with its axle 29. Counterclockwise rotation of the rocker arm 41 occurs when the vehicle frame 10 tends to move upwardly relative to its supporting surface. Conversely, it will be apparent that the application of a force tending to rotate the rocker arm 41 in the counterclockwise direction as viewed in Figure 4 will tend to lift the vehicle frame 10 after a previous collapse or lowering thereof.

The force tending to rotate the rocker arm 41 in the counterclockwise direction, for purposes of lifting the vehicle frame 10 upwardly, or maintaining it in its predetermined optimum position is applied by piston 42 which is reciprocably mounted in the cylinder 43. The piston 42 is moved toward the left by fluid under pressure in the chamber 44 and resiliency is introduced into the suspension of the trailing link 17 by means of the pneumatic spring generally indicated at 45 which is in hydraulic association with the chamber 44. This association may be seen in Figure 4 where pressurized gas or air, preferably of inert nature such as nitrogen is confined in a gas chamber 46 by means of an imperforate resilient confining wall 47. Hydraulic liquid, at substantially the same pressure as that found in chamber 44, is provided in chamber 48 and is in direct communication with the fluid in chamber 44 via the passageway 49. In the condition of vehicle equilibrium in which the frame 10 is positioned at a predetermined optimum level or attitude, the pressure in the chambers 44 and 48 will be sufficient to cause the piston 42 to maintain the rocker arm 41, and accordingly the trailing link 17 in supported condition. While the pressure applied to the oil in the chambers 44 and 48 may, of course, be supplied by means of an external high pressure source, such as for example a high pressure hydraulic pump, it is preferably supplied in the present invention by means of a self-contained pump actuated in response to oscillations of the vehicle suspension in response to operation over uneven roads and the like.

The self-contained pump may take the form shown in Figure 4 wherein a pump plunger 50 is reciprocably mounted within a cylindrical bore 51 for contact with abutment surface 52 on the rocker arm 41. The passageway 53 permits the flow of hydraulic fluids stored in the low pressure reservoir 54 to pass from the reservoir through the plunger past a ball check valve 55 to a pumping chamber 56. A spring 57 maintains the plunger 50 in position against the abutment 52 and provides the force for the return stroke of the plunger 50 during pumping operations. Hydraulic fluid leaves the chamber 56 by means of the passageway 59 and ball check 58 which direct it to the chamber 48.

In operation, as the rocker arm 41 is oscillated by the trailing link 17 during movement of the vehicle down a normal uneven road surface, the plunger 50 will be constantly reciprocated. As the plunger 50 reciprocates toward the right as viewed in Figure 4, the hydraulic fluid trapped in the chamber 56 is forced past the check valve 58 into the chamber 48 as soon as it builds up a pressure equal to the pressure in the chamber 48. On the return stroke, after the rocker arm 41 has oscillated in the opposite direction, upon wheel impact, the spring 57 will force the plunger 50 to the left thereby causing fluid to flow from the reservoir chamber 54 into the chamber 56 for the subsequent pumping stroke. While the pump plunger 50 has been illustrated as associated with the rocker arm 41 in such a manner as to provide a positive compression stroke during movement of the trailing link arm 17 in the downward or rebound condition, it will be obvious that if desired, the pump bore 51 may be positioned with its axes on the opposite side of the axis of rotation of the rocker arm 41 from that illustrated in Figure 4 to provide a pump compression stroke during the application of impact loads to the wheel and trailing link arm 17. In either case, it has been found that very satisfactory high pressure pumping operation is provided which is fully adequate to maintain the necessary leveling pressures in the chambers 44 and 48 substantially independently of the load applied to the vehicle, within reasonable design limits.

Control of the pressure in the chambers 44 and 48, which is necessary for providing the desired angular position of the rocker arm 41, and hence the desired attitude of the trailing link 17 of the vehicle frame 10, is provided by means of the leveling valve 60. The valve 60 comprises a first plunger 61 reciprocably mounted within the bore 62. As may be seen from Figure 4, the plunger 61 extends across port 63 in the cylinder 43 and thereby controls the release of liquid under pressure from the chamber 44 via the passageway 63 to the low pressure reservoir 54. The position of the plunger 61 is controlled by the springs 64 and 65 the former of which cooperates with a second plunger 66 which in turn reflects the position of the leveling piston 42 by means of the link 67 pivoted at 68 to the housing 40. The piston 61 is loosely fitted within the bore 62 and is permitted to move toward the right as viewed in Figure 4 only relatively slowly as hydraulic fluid trapped in the chamber 69 passes around the plunger 61 toward the vent aperture 70 in the plunger 66. The stop pin 59a prevents the piston 61 from overtraveling port 63.

In operation, assuming an initial condition in which the rocker arm 41 is positioned as shown in Figure 4 and the trailing link 17 is positioned in its neutral or optimum design attitude position, an increase in load on the vehicle frame will tend to move the rocker arm 41 in a clockwise direction to a new attitude condition. In this new attitude, the trailing link arm 17 will, of course, continue to oscillate with road unevenness thereby operating the pump plunger 50 but the arm 17 will return if not releveled to a condition, when the vehicle is at rest, in which it maintains the rocker arm in a position in which the end 41a is pivoted in a clockwise direction through a slight angle, for example, as shown at theta. However, movement of the end 41a of the rocker arm 41 toward the right, in response to the change in attitude of the trailing link arm 17 will permit the springs 64 and 65 to move the plungers 66 and 61 toward the left, pivoting the link 67 about the pivot pin 68 as it follows the piston 42. This movement permits the plunger 61 to completely cover the passageway 63, when the movement of the rocker arm 41 is relatively permanent rather than an instantaneous change due to road conditions. When the change is relatively permanent fluid flows through the slightly restrictive orifice 61a to permit the piston 61 to move to the left.

When the piston 61 covers the aperture or passageway 63, pressure immediately builds up in the chamber 44 and the chamber 48 as a result of the continuous pumping action of the pump plunger 50, thereby immediately urging the piston 42 toward the left to return the rocker arm 41 into its preliminary design attitude condition. As the piston 42 moves toward the left, the link 67 is pivoted in the clockwise direction around the pivot pin 68, forcing the plunger 66 toward the right and, through the resilient spring 64 urging the piston 61 toward the right to again partially uncover the passageway 63 to permit flow of fluid from the chamber 44 to the reservoir 54 as it is continually pumped under pressure into the chambers 44 and 48 by the pump 50. The greater restriction of fluid flow past piston 61 when it moves to the right than when it moves to the left, provided by check valve orifice 61a provides a margin of safety which positively prevents collapse of the system which might otherwise occur if moderately slow road variations occurred. As shown, the piston covers its port moderately rapidly but uncovers it slowly, responsive to more permanent changes in positions of the arm 41.

It is impossible for the present vehicle to assume a collapsed condition when left unused for a period of time since collapse of the system requires that the fluid in the chambers 44 and 48 be released to the reservoir 54 in some manner. This is prevented in the present system by the check valve 58 which blocks off any return flow through the pump 50 and by the plunger 61 which blocks off flow through the passageway 63. Thus, when the vehicle is at rest fluid under pressure will flow from the chamber 44 through the passageway 63 until the piston 42 moves sufficiently far toward the right to relieve the spring 64 with resultant covering of the passageway 63 by the piston 61.

The relatively loose fit between the piston or plunger 61 and the cylindrical bore 62 in which it reciprocably moves, may permit an additional slight leakage if the vehicle stands over a long period of time. However, complete collapse of the system is prevented upon such occurrence since the flow of fluid from the chamber 44 through the passage 63 would merely permit the piston 42 to move toward the right to cover the passageway 63 thereby completely blocking off all further flow. Thus, while the vehicle will assume a slightly collapsed position during periods of inactivity, total collapse is completely prevented.

In addition to the leveling control above described, a shock absorbing action is provided in the present system by means of a dashpot plunger 75 which is directly actuated by means of the arm 41b on the rocker arm 41. An impact orifice 76 provided with a ball check valve 77 permits flow of fluid from the chamber 78 to the chamber 79 upon the application of forces tending to raise the trailing link arm 17, upon the application of road impact forces, and a rebound orifice 80, having a check valve 81 permits return flow from the chamber 79 to the chamber 78 upon the rebound condition. The orifices 76 and 80 provide sufficient restriction to retard movement of the rocker arm 41 in the manner of a conventional dashpot. The relative sizes of the orifices 76 and 80 may, of course, be varied to provide any degree of damping control desired.

In the embodiment shown in Figure 5, the hydraulic-pneumatic spring, the leveling piston, and the leveling valve are identical to those shown in Figure 4 and are provided with the same numbers. However, instead of providing a separate hydraulic fluid pump, as at the plunger 50, the pump for providing pressurized fluid to the spring chamber 48 forms a part of the shock absorbing apparatus. Thus, in the modification shown in Figure 5, the chamber 79 is vented to the chamber 48 via a limiting passageway 82 and a check valve 83. Additionally, the chamber 79 is in fluid contact with the reservoir 54 via passageway 84 and check valve 85. Thus, as the shock absorber piston 75a moves toward the right during its usual shock absorbing function fluid trapped in the chamber 79 passes through the orifice 82 into the chamber 48 to provide high pressure for maintaining the leveling piston 42 in operative condition against the rocker arm 41. The orifice 82 is of a sufficiently small diameter as to prevent rapid flow therethrough since such rapid flow would, of course, destroy the shock absorbing action of the orifice 80 if the orifice 82 were of larger diameter than the orifice 80. It will be understood, of course, that while only the chamber 79 is illustrated as leading to the chamber 48 and operating as a pressure pump, the chamber 78 may likewise be utilized by providing a connecting conduit between the chamber 78 and the chamber 48 via a restricted orifice similar to that shown at 82. Check valve 86 controlling orifice 87 permits the ready utilization of the chamber 78 as a pumping chamber since it permits refilling thereof from the reservoir 54 subsequent to each compression stroke.

In the system illustrated, the pneumatic spring generally indicated at 45 is quite small in overall size. This may be accomplished through the utilization of extremely high pressure inert gas such as nitrogen in the chamber 46. While it is not intended that this gas be lost or otherwise reduced in quantity during the lifetime of the vehicle, a filling or refilling valve 46a is provided. The valve orifice 46b is additionally sealed by means of a threaded bolt 46c and a sealing washer 46d. While it is desirable, for purposes of space conservation to utilize such a small, high pressure, pneumatic spring unit, it will be understood that the apparatus of the present invention is usable with substantially any type of pneumatic spring utilizing substantially compressible gaseous fluid.

It will thus be apparent that I have provided a self-contained automatic vehicle leveling system having an absolute minimum of parts. The leveling unit 12 may be utilized with each individual wheel and automatically senses, by means of the piston 42 and the leveling valve piston 61, the position of the controlled wheels at all times. This individuality eliminates all need for using an average level of for example, the rear wheels as is done in prior systems by controlling the valve from a lever fixed to the mid point of a stabilizer for such as 16. In the present system by means of a pump constructed entirely within the unit pressure is applied to lift the vehicle frame relative to the wheel when an additional load is applied to the vehicle, thereby returning the vehicle to its predetermined design attitude or, alternately, should the vehicle body be raised relative to its supporting surface, as a result of a removal of a portion of the load therefrom, pressure will be released from the system by the leveling valve 61, likewise positioned completely within the unit, to permit the vehicle frame to lower to its design attitude. Further, shocks imparted to the system by uneven road surfaces are dampened by an integrated shock absorbing apparatus and are additionally utilized as a source of energy for operating the pump to supply hydraulic fluid under pressure for maintaining the vehicle at its design attitude. By providing a pneumatic spring, an extremely low spring rate may be provided, which increases as the hydraulic pressure in the chamber 48 is increased to return the rocker arm 41, and hence the trailing link of the rear suspension, to their design attitude under increasing vehicle loads. The low spring rate provided by a pneumatic spring when the vehicle is relatively unloaded is very advantageous since it permits a smooth ride in the vehicle and, when used with the system herein illustrated, does not prevent the vehicle from operating at its optimum level or attitude. The system is thus far superior to systems employing metallic springs in which the spring rate is essentially constant and wherein the vehicle must necessarily ride roughly when in the unloaded condition even though some means of mechanically leveling are provided.

In certain type of vehicles it may be found desirable to provide adjustment of the optimum level or attitude of the vehicle. In the present system this may advantageously be accomplished by providing an eccentric adjusting pivot for the lever 67 controlling the leveling valve. This is illustrated at 68a in Figure 4. The pivot 68 and eccentric 68a may be rotated by any conventional means such as for example a lever (not shown) secured to pivot 68.

By providing a trailing link rear wheel suspension, control of the individual rear wheels may be achieved through a compact unit secured entirely within the frame members 10 and away from possible injury. As will be readily apparent, the leveling units illustrated in the accompanying drawings may be constructed inexpensively and, since they completely replace conventional shock absorbers, metallic springs and mechanical leveling apparatus that is incorporated in some presently known mechanical spring systems, the total cost of the vehicle may be substantially reduced through the use of the apparatus of the present invention.

It will, of course, be obvious to those skilled in the art that manifold variations and modifications may be made in the structure hereinabove set forth without departing from the scope of the novel concepts thereof. It is, accordingly, my intention that the scope of the present invention be limited solely by that of the herein-after appended claims.

I claim as my invention:

1. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump having a relatively low pressure inlet, means unidirectionally connecting the output of said pump to one of said liquid chambers, a port in said second chamber venting said chamber to said low pressure inlet, valve means controlling said port, and means, responsive to movement of said piston in a direction to move said rocker arm to lift said frame relative to said axle in response to pressure built up in said second chamber, to open said valve means.

2. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connected said piston to said arm, hydraulic connecting means between said hydraulic chambers whereby reciprocation of said piston to contract said second chamber will cause expansion of said first chamber and vice versa, a hydraulic pump in said housing operatively connected to said arm for pumping operation by oscillation of said arm, means unidirectionally connecting the output of said pump to one of said liquid chambers, a port in said second chamber directing liquid therein to a low pressure sump of the pump, valve means controlling said port, and means, responsive to movement of said piston in a direction to move said rocker arm to lift said frame relative to said axle in response to pressure built up in said second chamber to open said valve means.

3. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a reciprocating hydraulic pump in said housing operatively connected to said arm for reciprocation when said arm pivots, means unidirectionally connecting the output of said pump to one of said liquid chambers, a port in said second chamber venting said chamber to a low pressure sump of the pump, valve means controlling said port, and means, responsive to movement of said piston in a direction to move said rocker arm to lift said frame relative to said axle in response to pressure built up in said second chamber, to open said valve means.

4. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump, means unidirectionally connecting the output of said pump to one of said chambers, a port in said second chamber, valve means controlling said port, and means, responsive to movement of said piston to move said rocker arm to lift said frame relative to said axle in response to pressure built up in said second chamber, to open said valve means, said port lying in the path of reciprocation of said piston whereby upon movement of said piston and arm to collapse the system and lower the frame relative to said axle, said piston will cover said port and prevent further collapse.

5. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump, means unidirectionally connecting the output of said pump to one of said chambers, a port in said second chamber, valve means controlling said port, means responsive to movement of said piston to move said rocker arm to lift said frame relative to said axle in response to pressure built up in said second chamber, to open said valve means, said last named means comprising a reciprocable plunger slidable in a bore connected to said port, means biasing said plunger in a position covering said port to close it, and linkage means connecting said piston to said plunger whereby movement of said piston to lift said frame will oppose said biasing means through said linkage means.

6. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump, means unidirectionally connecting the output of said pump to one of said chambers, a port in said second chamber, valve means controlling said port, means responsive to movement of said piston to move said rocker arm to lift said frame relative to said axle in response to pressure built up in said second chamber, to open said valve means, said last named means comprising a reciprocable plunger slidable in a bore connected to said port, means biasing said plunger in a position covering said port to close it, linkage means connecting said piston to said plunger whereby movement of said piston to lift said frame will oppose said biasing means through said linkage means, and means for substantially retarding movement of said plunger in at least one direction of movement, and means for modifying said linkage means to change the level of the system.

7. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump, means unidirectionally connecting the output of said pump to one of said chambers, a port in said second chamber, valve means controlling said port, means responsive to movement of said piston to move said rocker arm to lift said frame relative to said axle in response to pressure built up in said second chamber, to open said valve means, said last named means comprising a reciprocable plunger slidable in a bore connected to said port, means biasing said plunger in a position covering said port to close it, linkage means connecting said piston to said plunger whereby movement of said piston to lift said frame will oppose said biasing means through said linkage means, said linkage including resilient means, and means for substantially retarding movement of said plunger in at least one direction of movement whereby said plunger will move to control said port only upon a substantially consistently assumed position of said piston.

8. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump, means unidirectionally connecting the output of said pump to one of said chambers, a port in said second chamber, valve means controlling said port, means, responsive to movement of said piston to move said rocker arm to lift said frame relative to said axle in response to pressure built up in said second chamber, to open said valve means, and damping means operatively connected to said arm for absorbing shocks imparted to said arm by said suspension.

9. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump, means unidirectionally connecting the output of said pump to one of said chambers, a port in said second chamber, valve means controlling said port, means responsive to movement of said piston to move said rocker arm to lift said frame relative to said axle in response to pressure built up in said second chamber, to open said valve means, and damping means operatively connected to said arm for absorbing shocks imparted to said arm by said suspension, said last named means comprising a piston reciprocable in a cylindrical bore and secured to said arm for reciprocation thereby upon oscillation thereof, said last named piston having restrictive orifices therethrough and being surrounded by liquid whereby movement of said last named piston is retarded by said liquid.

10. A levelling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump, means unidirectionally connecting the output of said pump to one of said chambers, a port in said second chamber, valve means controlling said port, means responsive to movement of said piston to move said rocker arm to lift said frame relative to said axle in response to pressure built up in said second chamber, to open said valve means, and damping means operatively connected to said arm for absorbing shocks imparted to said arm by said suspension, said last named means comprising a piston reciprocable in a cylindrical bore and secured to said arm for reciprocation thereby upon oscillation thereof, said last named piston having restrictive orifices therethrough and being surrounded by liquid whereby movement of said last named piston is retarded by said liquid, said hydraulic pump comprising a fluid flow passage in one end of said last named piston, means preventing flow of fluid from the end of said piston back through said passageway, means connecting the end of said passageway opposite from said check valve to a low pressure reservoir, means connecting said last named cylinder at the end thereof facing said check valve to one of said chambers, said last named means comprising a check valve permitting flow only from said last named cylinder to said chamber.

11. A self-contained levelling system for a vehicle having a frame and a wheel axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber in said housing having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump in said housing operatively connected to said arm for pumping operation by oscillation of said arm, means unidirectionally connecting the output of said pump to one of said chambers, a port in said second chamber leading from said second chamber to a low pressure reservoir in said housing, valve means, controlling said port and means responsive to movement of said piston to move said rocker arm to lift said frame relative to said axle in response to pressure built up in said second chamber, to open said valve means.

12. A self-contained levelling system for a vehicle having a frame and a wheel axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber in said housing having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump in said housing operatively connected to said arm for pumping operation by oscillation of said arm, means unidirectionally connecting the output of said pump to one of said chambers, a port in said second chamber leading from said second chamber to a low pressure reservoir in said housing, valve means controlling said port and means, responsive to movement of said piston to move said rocker arm to lift said frame relative to said axle in response to pressure built up in said second chamber, to open said valve means, said port lying in the path of reciprocation of said piston whereby upon movement of said piston and arm to collapse the system and lower the frame relative to said axle said piston will cover said port and prevent further collapse.

13. A self-contained levelling system for a vehicle having a frame and a wheel axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber in said housing having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump in said housing operatively connected to said arm for pumping operation by oscillation of said arm, means unidirectionally connecting the output of said pump to one of said chambers, a port in said second chamber leading from said second chamber to a low pressure reservoir in said housing, valve means controlling said port and means responsive to movement of said piston to move said rocker arm to lift said frame relative to said axle in response to pressure built up in said second chamber, to open said valve means, said last named means comprising a reciprocable plunger slidable in a bore connected to said port and vented to said reservoir, means biasing said plunger into a position covering said port to close it and linkage means connecting said piston to said plunger to move said plunger in opposition to said biasing means when pressure builds up in said second chamber.

14. A self-contained levelling system for a vehicle having a frame and a wheel axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber in said housing having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump in said housing operatively connected to said arm for pumping operation by oscillation of said arm, means unidirectionally connecting the output of said pump to one of said chambers, a port in said second chamber leading from said second chamber to a low pressure reservoir in said housing, valve means controlling said port and means responsive to movement of said piston to move said rocker arm to lift said frame relative to said axle in response to pressure built up in said second chamber, to open said valve means, said last named means comprising a reciprocable plunger slidable in a bore connected to said port and vented to said reservoir, means biasing said plunger into a position covering said port to close it and linkage means connecting said piston to said plunger to move said plunger in opposition to said biasing means when pressure builds up in said second chamber, said linkage including resilient means, and damping means for substantially retarding movement of said plunger whereby movement of said plunger will occur only after a relatively permanent movement of said piston.

15. A leveling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing, a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump having a relatively low pressure inlet, means unidirectionally connecting the output of said pump to one of said liquid chambers, a port in said second chamber venting said chamber to said low pressure inlet, valve means controlling said port, means responsive to movement of said piston in a direction to move said rocker arm to lift said frame relative to said axle in response to pressure build-up in said second chamber, to open said valve means, and means retarding the movement of said valve means in a direction to open said port.

16. A leveling system for vehicles having a frame and a rear axle suspended therefrom comprising, a housing secured to said frame, a rocker arm pivotally secured in said housing, means operatively connecting said wheel axle to said arm whereby movements of said axle relative to said frame will cause oscillation of said arm in said housing and vice versa, a gas filled spring chamber and a first hydraulic liquid filled chamber having a movable wall therebetween, a second hydraulic liquid chamber in said housing a piston forming one wall of said last named chamber, means operatively connecting said piston to said arm, hydraulic connecting means between said hydraulic chambers whereby reciprocation of said piston to contract said second chamber will cause expansion of said first chamber and vice versa, a hydraulic pump in said housing operatively connected to said arm for pumping operation by oscillation of said arm, means unidirectionally connecting the output of said pump to one of said liquid chambers, a port in said second chamber directing liquid therein to a low pressure sump of the pump, valve means controlling said port, means responsive to movement of said piston in a direction to move said rocker arm to lift said frame relative to said axle in response to pressure build-up in said second chamber, to open said valve means, and means retarding the movement of said valve means in a direction toward opening said port.

References Cited in the file of this patent

UNITED STATES PATENTS 2,436,573    Heynes _____ Feb. 24, 1948